July 25, 1961 H. A. BRADY 2,993,330
AUTOMATIC SELF-CLEANING RAKE
Filed June 12, 1959 2 Sheets-Sheet 1

Harry A. Brady
INVENTOR.

July 25, 1961  H. A. BRADY  2,993,330
AUTOMATIC SELF-CLEANING RAKE
Filed June 12, 1959  2 Sheets—Sheet 2
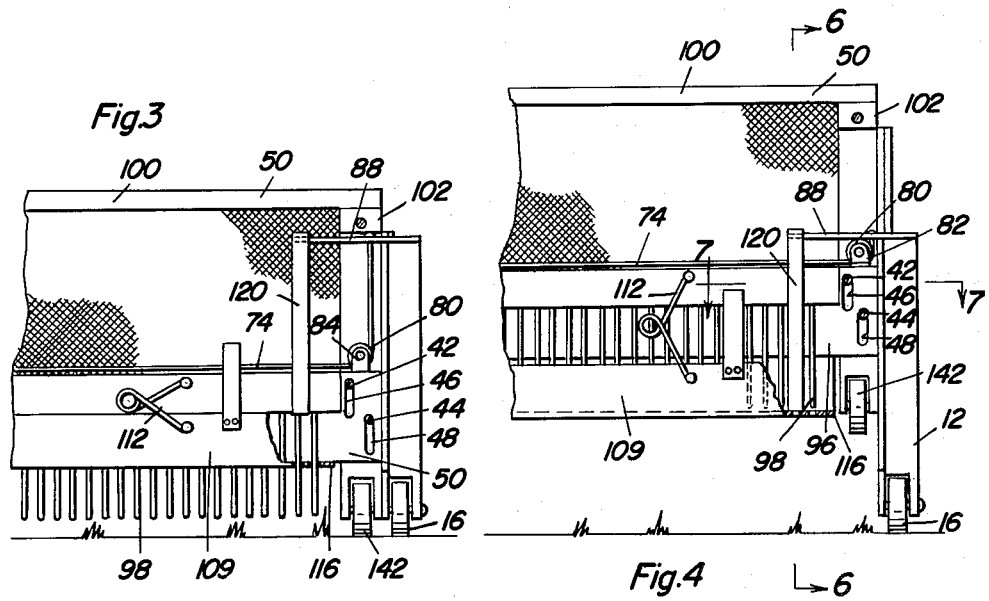
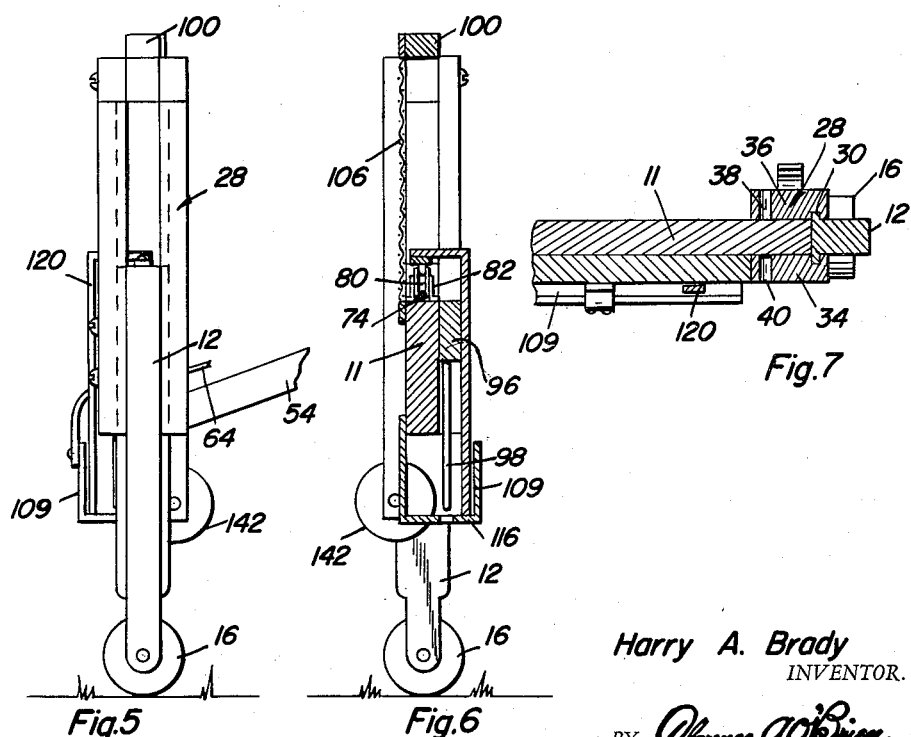
Harry A. Brady
INVENTOR.

United States Patent Office 2,993,330
Patented July 25, 1961

2,993,330
AUTOMATIC SELF-CLEANING RAKE
Harry A. Brady, R.F.D. 1, Strasburg, Ohio
Filed June 12, 1959, Ser. No. 819,981
6 Claims. (Cl. 56—400.09)

This invention relates to garden tools, and more particularly to a rake provided with means by which to clean leaves, trash and other debris from the tines thereof.

An object of the invention is to provide a rake having a means operable by a single manipulation, for cleaning the tines.

Briefly, a rake in accordance with the invention has one or more rows of tines supported by a tine bar which is arranged to be raised and lowered with reference to a cleaning member so that the tines in passing through a group of apertures in the cleaning member have the debris removed therefrom.

A further object of the invention is to provide a rake which may be used for numerous purposes, but which has particular application in connection with raking leaves and the like inasmuch as leaves have a tendency to become stuck between the tines of an ordinary rake. Further, the preferred form of the rake has a screen or other baffle forming an upright extension of the tines so that large quantities of leaves may be raked without having them ride over the upper edge of the tine bar.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of the rake, parts being broken away in section to illustrate otherwise hidden detail.

FIGURE 2 is another perspective view of the rake showing it at an angle different from that from which FIGURE 1 is viewed, parts being broken away in section to illustrate otherwise hidden detail.

FIGURE 3 is an enlarged fragmentary elevational view of one end of the rake, parts broken away in section, and showing the tines in a lowered position.

FIGURE 4 is a fragmentary elevational view similar to FIGURE 3 but showing the tines in an elevated position.

FIGURE 5 is an enlarged end view of the rake as shown in FIGURE 1.

FIGURE 6 is an enlarged sectional view taken on the line 6—6 of FIGURE 4.

FIGURE 7 is an enlarged sectional view taken on the line 7—7 of FIGURE 4.

Figures 1, 2:
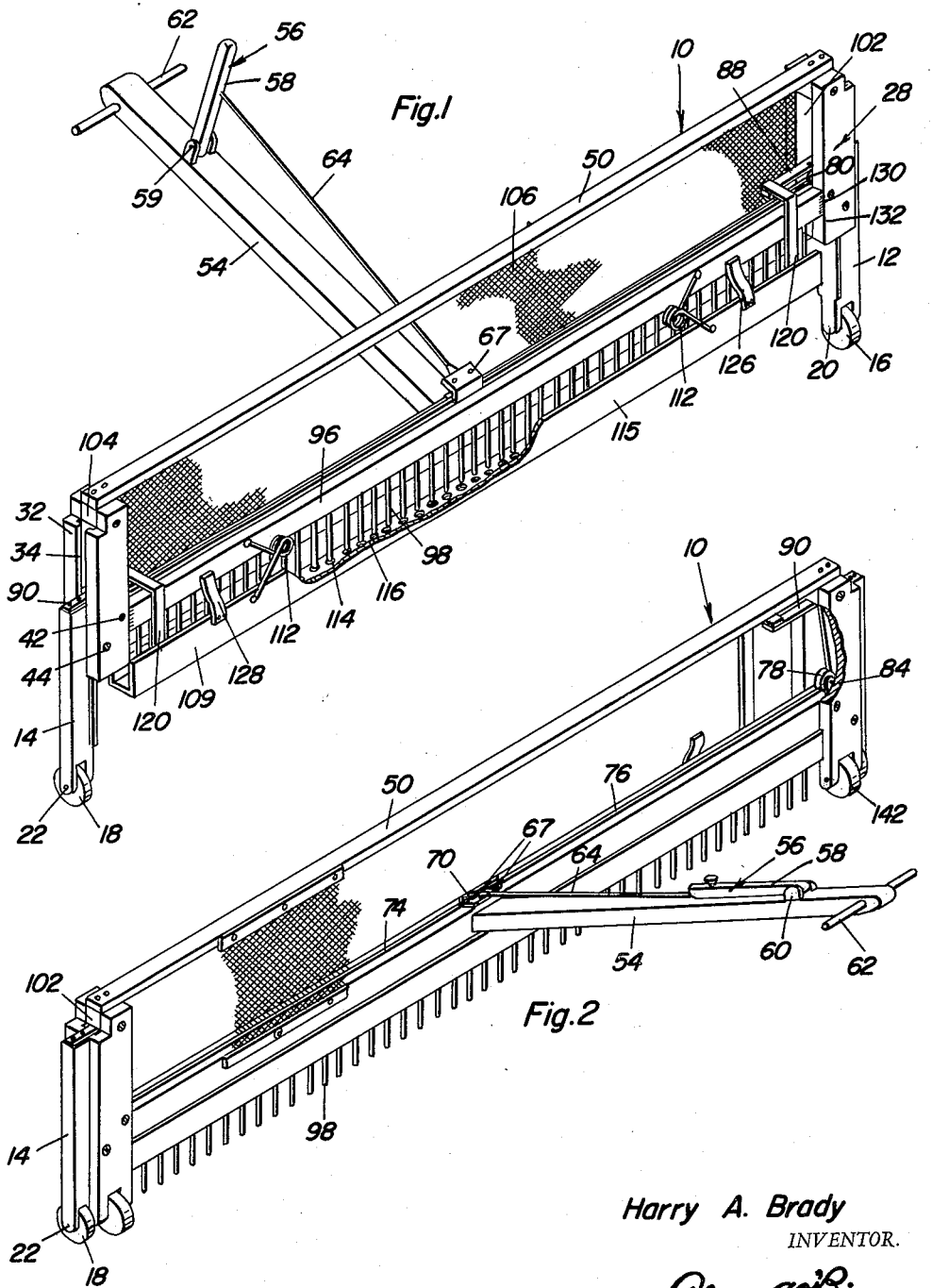

In the accompanying drawings, there is a rake 10 which exemplifies the principles of the invention. This rake has a base 11 with a pair of posts 12 and 14 at opposite ends thereof, and these are preferably supported by wheels 16 and 18 mounted for rotation on spindles 20 and 22 which are carried by the lower notched ends of the posts 12 and 14. As shown best in FIGURE 7 where typical post 12 is illustrated in cross-section, it is T-shaped and has a slide structure 28 mounted for vertical movement thereon. The slide structure 28 has a T-shaped slot 30 within which T-shaped post 12 is nested. An identical slide structure 32 having a T-shaped slot 34 is operatively connected with the post 14. In fact, both ends of the rake 10 are identically constructed. Slide structure 28 is composed of two plates 34 and 36 fitting flush against front and rear faces of post 12, and each of the plates has a pair of aligned apertures 38 and 40 laterally offset from each other (FIGURES 3 and 4) through which bolts 42 and 44 extend. These bolts are adjustment bolts and they operate in slots 46 and 48 formed in frame 50 which will be described in more detail subsequently.

A handle 54 is secured at its inner end to base 11 and is used to propel the rake. The handle has an operating mechanism 56 partially carried thereby. The portion of mechanism 56 which is carried by the handle consists of a lever 58 mounted for pivotal movement on a spindle 59 at one end, the spindle being supported by ears 60 on the handle near the handle bars 62 of the handle. A cable 64 or a rope is secured to the lever 58 and extends to bracket 67 containing a pair of pulleys 70 over which the divided cable portions 74 and 76 are entrained. Cable portions 74 and 76 are entrained over pulleys 78 and 80, and these are supported by pulley brackets 82 and 84, each of which is fixed to frame 50. The extremities of the cable portions 74 and 76 are secured to inwardly extending brackets 88 and 90 that are attached to the upper ends of posts 12 and 14. Accordingly, when lever 58 is moved from the position shown in FIGURE 2 to the position shown in FIGURE 1, the cable 64 and its portions 74 and 76 plus the guide pulleys in bracket 67 are pulled, and this lifts pulleys 78 and 80 plus frame 50 to which they are secured.

Frame 50 has a lower tine bar 96 to which the tines 98 of the rake are secured. It has an upper frame member 100 together with side frame members 102 and 104 secured to the upper frame member 100 and the lower frame member or tine bar 96, thereby forming a rectangular frame 50. A baffle, such as screen 106 is secured to the four frame members of frame 50 and is vertically movable with the tines in response to adjustment of mechanism 56 as aforesaid. Springs 112 are secured at their ends to the tine bar 96 and to a cleaning member 109 which is parallel to tine bar 96. As seen in FIGURE 1, springs 112 are preferably coil springs with elongate ends, and the extremities of the springs are secured to the cleaning member 109 and tine bar 96, respectively.

Cleaning member 109 is channel-shaped in cross-section and has a group of apertures 114 in the lower wall 116 thereof. Cleaning member 109 is movable a limited distance with frame 50 as the frame is elevated in response to operation of mechanism 56. Consequently, it is solely supported by springs 112 and as the frame 50 is lifted together with the tine bar 96, cleaning member 109 is also lifted, but there are stops 120 secured to the lateral brackets 88 and 90 and these abut the bottom wall 116 of cleaning member 109 as the cleaning member and frame 50 are simultaneously elevated by mechanism 56. As soon as the stops 120 contact the wall 116 the upward stroke of cleaning member 109 is ended, but the frame 50 is free to move upward a further distance. To assure alignment of the tines 98 and apertures 114, there are guide straps 126 and 128, for instance, thin metal straps, secured to side 115 of cleaning member 109 and slidingly contacting a surface of tine bar 96. The bolts 42 and 44 which have been mentioned previously limit the extent of free movement of the tine bar (and consequently the tines) with reference to the cleaning member 109. These will also establish the effective length of the tines, i.e., the length of tines protruding downwardly from wall 116 of the cleaning member 109 and therefore rows 130 of graduations are on tine bar 96 and they cooperate with the reference graduation 132 on structure 28 and structure 30. The graduations constitute an index for indicating the extent of protrusion of the tines 98 beyond cleaner 15.

To facilitate operation, it is preferred that the structures 28 and 30 have ground engaging wheels 142 at the lower extremities thereof, these wheels being supported in a manner identical to wheels 18 and 20, and they are ground engaging when frame 50 is in a lowermost position (FIGURE 3).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rake comprising an elongated frame including a tine bar having raking teeth there along, a cleaning element having contact portions thereon extending along said tine bar and having said teeth engaging said contact portions, a relatively movable ground engaging support on each end of said frame and operating means interconnecting said supports and said frame for causing relative movement thereof, resilient means between said frame and said cleaning element urging the same into contact with each other.

2. A rake as defined in claim 1 wherein said cleaning element is formed with a plurality of spaced apertures therethrough, said apertures normally receiving said teeth, edges defining said apertures, said edges comprising said contact portions.

3. A rake as defined in claim 1 wherein each of said supports comprise a post, a wheel journaled at one end of each post and adapted to engage the ground when the rake is in operative position on the ground.

4. The rake as defined in claim 1 wherein a baffle is secured to said frame, said baffle extending substantially from one end of said bar to the other end and projecting away from said bar and ground engaging portions on said supports.

5. A rake comprising an elongated frame including a tine bar having raking teeth there along, a cleaning element having contact portions thereon extending along said tine bar and having said teeth engaging said contact portions, a relatively movable ground engaging support on each end of said frame and operating means interconnecting said supports and said frame for causing relative movement thereof, resilient means between said frame and said cleaning element urging the same into contact with each other, stop means on at least one of said supports at an intermediate point in the path of movement of said cleaning element to stop movement of said cleaning element and cause cleaning of said teeth.

6. A rake comprising a pair of spaced vertically extending supports, ground engaging means at one of the ends of each of said supports, slide structures, a tine bar extending between said supports, tines carried by said tine bar, said slide structures slidably connecting said tine bar to said supports for sliding movement, a cleaning member extending adjacent the tines in wiping contact therewith, a resilient means directly connected to said tine bar and wiping member for supporting said wiping member on said tine bar, a mechanism operatively connected to said tine bar and supports for elevating said tine bar and wiping member, and stop means connected to said supports and engageable with said cleaning member to limit its extent of upward movement with respect to said supports whereby the tines may move relative to said cleaning member for cleaning said tines.

References Cited in the file of this patent

UNITED STATES PATENTS

| 1,113,488 | Ruch | Oct. 13, 1914 |
| 1,859,179 | Strahm | May 17, 1932 |
| 2,178,288 | Potts | Oct. 31, 1939 |

FOREIGN PATENTS

| 231,442 | Switzerland | June 16, 1944 |